(12) United States Patent
Oates

(10) Patent No.: US 8,690,476 B2
(45) Date of Patent: Apr. 8, 2014

(54) METHOD AND SYSTEM FOR STORING HYDROGEN IN A SALT CAVERN WITH A PERMEATION BARRIER

(75) Inventor: Rommel M. Oates, Spring, TX (US)

(73) Assignee: Praxair Technology, Inc., Danbury, CT (US)

( * ) Notice: Subject to any disclaimer, the term of this patent is extended or adjusted under 35 U.S.C. 154(b) by 76 days.

(21) Appl. No.: 13/480,864

(22) Filed: May 25, 2012

(65) Prior Publication Data

US 2013/0315669 A1 Nov. 28, 2013

(51) Int. Cl.
*B65G 5/00* (2006.01)

(52) U.S. Cl.
USPC .............................................. 405/56; 405/54

(58) Field of Classification Search
USPC .................. 405/52, 53, 54, 55, 56, 57, 58, 59
See application file for complete search history.

(56) References Cited

U.S. PATENT DOCUMENTS

| | | | |
|---|---|---|---|
| 2,878,165 A | | 3/1959 | Cottle |
| 3,438,203 A | | 4/1969 | Lamb et al. |
| 3,807,181 A | * | 4/1974 | Kuhne ............................ 405/59 |
| 4,025,321 A | | 5/1977 | Anderson et al. |
| 4,183,369 A | | 1/1980 | Thomas |
| 4,353,214 A | * | 10/1982 | Gardner ........................ 60/652 |
| 4,577,999 A | * | 3/1986 | Lindorfer et al. .............. 405/53 |
| 4,592,677 A | | 6/1986 | Washer |
| 4,626,131 A | * | 12/1986 | Glew et al. ..................... 405/53 |
| 4,830,056 A | | 5/1989 | Chamberlain |
| 5,511,905 A | * | 4/1996 | Bishop et al. .................. 405/53 |
| 5,669,734 A | | 9/1997 | Becnel, Jr. et al. |
| 5,842,519 A | * | 12/1998 | Sydansk ....................... 405/264 |
| 6,080,306 A | | 6/2000 | Falkner |
| 6,503,299 B2 | | 1/2003 | Baksh et al. |
| 6,511,528 B1 | | 1/2003 | Lansbarkis et al. |
| 6,576,138 B2 | | 6/2003 | Sateria et al. |
| 6,581,618 B2 | | 6/2003 | Hill et al. |
| 6,880,348 B2 | * | 4/2005 | Bishop et al. ................... 405/53 |
| 7,078,011 B2 | | 7/2006 | Morrow et al. |
| 7,152,675 B2 | * | 12/2006 | Heard ............................. 405/53 |
| 8,425,149 B2 | * | 4/2013 | Drnevich ........................ 405/53 |
| 2004/0123738 A1 | | 7/2004 | Spencer |

(Continued)

FOREIGN PATENT DOCUMENTS

JP 58 191399 A 11/1983

OTHER PUBLICATIONS

Pottier, J.D. and Blondin, E. "Mass Storage of Hydrogen" NATO ASI Series. Series E., Applied Sciences; Hydrogen Energy System : Production and Utilization of Hydrogen and Future Aspect; [Proceedings of the NATO Advanced Study Institute on Hydrogen Energy System, Utilization of Hydrogen and Future Aspects], vol. 295, Jan. 1, 1995, pp. 167-179, XP008139790, ISSN: 0168-132X.

(Continued)

*Primary Examiner* — Frederick L Lagman
(74) *Attorney, Agent, or Firm* — Nilay S. Dalal

(57) ABSTRACT

A novel method and system for storing high purity hydrogen into a salt cavern is provided. Particularly, the storage process involves storing high purity hydrogen into a salt cavern without seepage or leakage of the stored hydrogen through the salt cavern walls, by creating a permeation barrier along the salt cavern walls. The cavern pressure is monitored and controlled to ensure formation and maintenance of the permeation barrier. Optional temperature treatments may also be incorporated as desired.

22 Claims, 5 Drawing Sheets

(56) References Cited

U.S. PATENT DOCUMENTS

| | | | |
|---|---|---|---|
| 2005/0220704 A1* | 10/2005 | Morrow et al. | 423/658.3 |
| 2006/0216811 A1* | 9/2006 | Cunningham et al. | 435/262 |
| 2009/0010714 A1* | 1/2009 | Bishop | 405/53 |
| 2010/0101789 A1* | 4/2010 | Dickinson et al. | 405/53 |
| 2010/0200229 A1* | 8/2010 | Jefferd | 166/272.2 |
| 2011/0305515 A1 | 12/2011 | Drnevich | |

OTHER PUBLICATIONS

Y. Breele, et al.; "Technico-Economic Study of Distributing Hydrogen for Automotive Vehicles"; International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10.1016/0360-3199(79)90005-3 (retrieved on Jan. 1, 1979) p. 297-p. 299; Figure 2.

J.D. Pottier et al; "Mass Storage of Hydrogen"; NATO ASI Series. Series E, Applied Sciences; Hydrogen Energy System: Production and Utilization of Hydrogen and Future Aspects; (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132X, pp. 167-170; Figures 1-3, 8.

R.D. Venter, et al; "Modelling of Stationary Bulk Hydrogen Storage Systems"; International Journal of Hydrogen Energy, Elsevier Sci8ence Publishers B.V., Barking, GB, vol. 22, No. 8, Aug. 1, 1997, pp. 791-798, XP004075354, ISSN: 0360-3199, DOI: DOI:10.1016/S0360-3199(96)00210-8, p. 791-793; Tables 1, 2.

\* cited by examiner

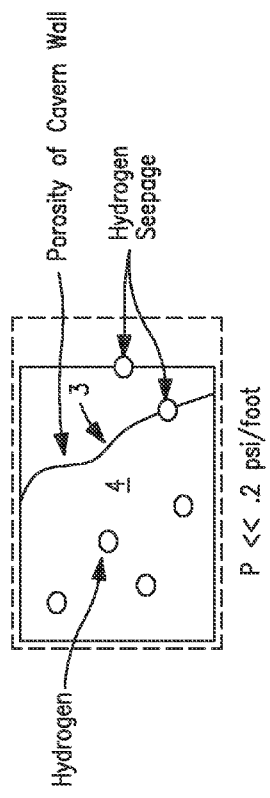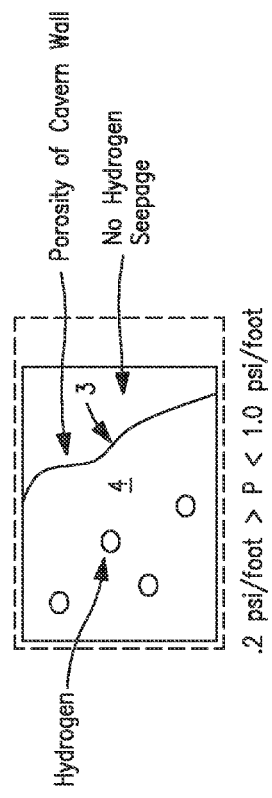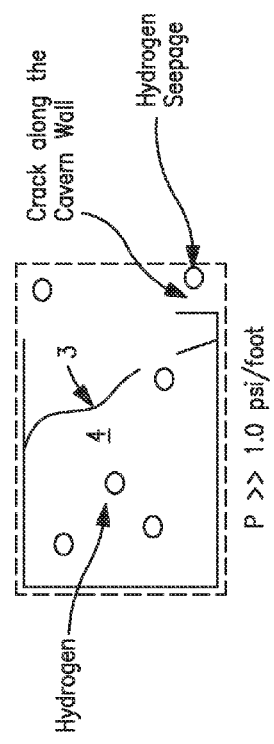

METHOD AND SYSTEM FOR STORING HYDROGEN IN A SALT CAVERN WITH A PERMEATION BARRIER

FIELD OF THE INVENTION

The present invention relates to a novel method and system for storing high purity hydrogen into a salt cavern. Particularly, the storage process involves storing high purity hydrogen into a salt cavern without seepage or leakage of the stored hydrogen through the salt cavern by creating a permeation barrier.

BACKGROUND OF THE INVENTION

Hydrogen is supplied to customers connected to a hydrogen pipeline system. Typically, the hydrogen is manufactured by steam methane reforming in which a hydrocarbon and steam are reacted at high temperature in order to produce a synthesis gas containing hydrogen and carbon monoxide. Hydrogen is separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream. Typically, hydrogen is supplied to customers under agreements that require availability and on stream times for the steam methane reformer or hydrogen recovery plant. When a steam methane reformer is taken off-line for unplanned or extended maintenance, the result could be a violation of such agreements. Additionally, there are instances in which customer demand can exceed hydrogen production capacity of existing plants. Having a storage facility to supply back-up hydrogen to the pipeline supply is therefore desirable in connection with hydrogen pipeline operations. Considering that hydrogen production plants on average have production capacities that are roughly 50 million standard cubic feet per day or greater, a storage facility for hydrogen that would allow a plant to be taken off-line, to be effective, would need to have storage capacity in the order of 1 billion standard cubic feet or greater.

The large storage capacity can be met by means of salt caverns to store the hydrogen underground. Low purity grades of hydrogen (i.e., below 95% purity) as well as other gases have been stored in salt caverns. Salt caverns are large underground voids that are formed by adding fresh water to the underground salt, thus creating brine, which is often referred to as solution mining. Caverns are common in the gulf states of the United States where demand for hydrogen is particularly high. Such hydrogen storage has taken place where there are no purity requirements or less stringent (<96% pure) requirements placed upon the hydrogen product. In such case, the stored hydrogen from the salt cavern is simply removed from the salt cavern without further processing.

High purity (e.g., 99.99%) hydrogen storage within salt caverns presents several challenges. For example, storing large quantities (e.g., greater than 100 million standard cubic feet) of pure (e.g., 99.99%) gaseous hydrogen in underground salt caverns consisting of a minimum salt purity of 75% halite (NaCl) or greater without measurable losses is difficult based on the properties of hydrogen. Hydrogen is the smallest and lightest element within the periodic table of elements, having an atomic radius measuring 25 pm+/−5 pm. Further, hydrogen is flammable, and therefore a very dangerous chemical if not handled properly. Salt caverns consist of salt that have various ranges of permeability (e.g., $0\text{-}23\times10^{-6}$ Darcy) that if not controlled properly could easily allow gaseous hydrogen to permeate through the salt and escape to the surface of the formation. If the stored hydrogen within an underground salt formation was to escape and permeate through the salt formation to the surface, a dangerous situation could arise with fatality potential or immense structural damage potential. Consequently, high purity hydrogen is typically considered one of the most difficult elements to contain within underground salt formations.

As will be discussed, among other advantages of the present invention, an improved method and system for storing hydrogen in a salt cavern is disclosed.

SUMMARY OF THE INVENTION

The invention relates, in part, to a method and system for storing high purity hydrogen into a salt cavern. The cavern pressure has been found to affect the ability to form a leak-tight cavern not susceptible to hydrogen leakage. It has been found that maintaining the cavern pressure within a specific pressure range improves the structural integrity of the salt cavern. The method and system for storage as will be explained below is capable of storing high purity hydrogen without detection of substantial seepage through the salt cavern. The storage process is conducive for the storage of hydrogen having purity levels from at least 95% up to about 99.999% or greater.

In a first aspect, a method for storing hydrogen product in a salt cavern is provided. Hydrogen product is removed from a hydrogen pipeline. The hydrogen product is compressed to produce a compressed hydrogen product. The compressed product of hydrogen is introduced into the salt cavern to produce stored hydrogen within the salt cavern. The stored hydrogen is maintained at a pressure between a lower limit and an upper limit within the cavern, whereby the salt cavern forms a substantially impermeable barrier to the stored hydrogen therein between the lower limit and the upper limit.

In a second aspect, a method for forming and maintaining a permeation barrier of a salt cavern is provided. A fluid is compressed to produce a compressed fluid. The compressed fluid is introduced into a salt cavern to produce stored fluid within the salt cavern. A permeation barrier is formed at least along a portion of walls of the salt cavern, wherein a porosity of the walls of the salt cavern is partially reduced to a size substantially small so as to prevent all of the stored hydrogen from passing therethrough. The pressure of the salt cavern is regulated above a lower limit and below an upper limit to maintain the permeation barrier.

In a third aspect, a system for forming and maintaining a permeation barrier within a salt cavern is provided. A compressor is configured to pressurize hydrogen product within the salt cavern to form stored hydrogen. A flow network is positioned between the compressor and the salt cavern. The flow network comprises a first leg, a second leg and a third leg. The first leg is in flow communication with the salt cavern to introduce product hydrogen into the salt cavern to form stored hydrogen that is stored at a pressure above a lower limit and below an upper limit to form a permeation barrier. The second leg is in flow communication with a hydrogen pipeline and the first leg to discharge the stored hydrogen formed from the salt cavern. The third leg is in flow communication with the salt cavern to introduce a fluid into the cavern to maintain the permeation barrier.

Advantageously, the system of the present invention can be constructed utilizing system components that are commercially available, thus enabling and simplifying the overall assembly of the system and method of use thereof. Aspects of hydrogen product storage delivery within the salt cavern can be carried out using standard techniques or equipment.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 4a shows a salt cavern wall containing stored hydrogen at a pressure below a lower limit in which hydrogen seepage across the salt cavern occurs;

FIG. 4b shows a salt cavern wall containing stored hydrogen at a pressure within the pressure threshold limits so as to form a permeation barrier in accordance with the principles of the present invention;

FIG. 4c shows a salt cavern wall containing stored hydrogen at a pressure above the upper limit in which hydrogen leakage occurs;

DETAILED DESCRIPTION OF THE INVENTION

Figure 1:
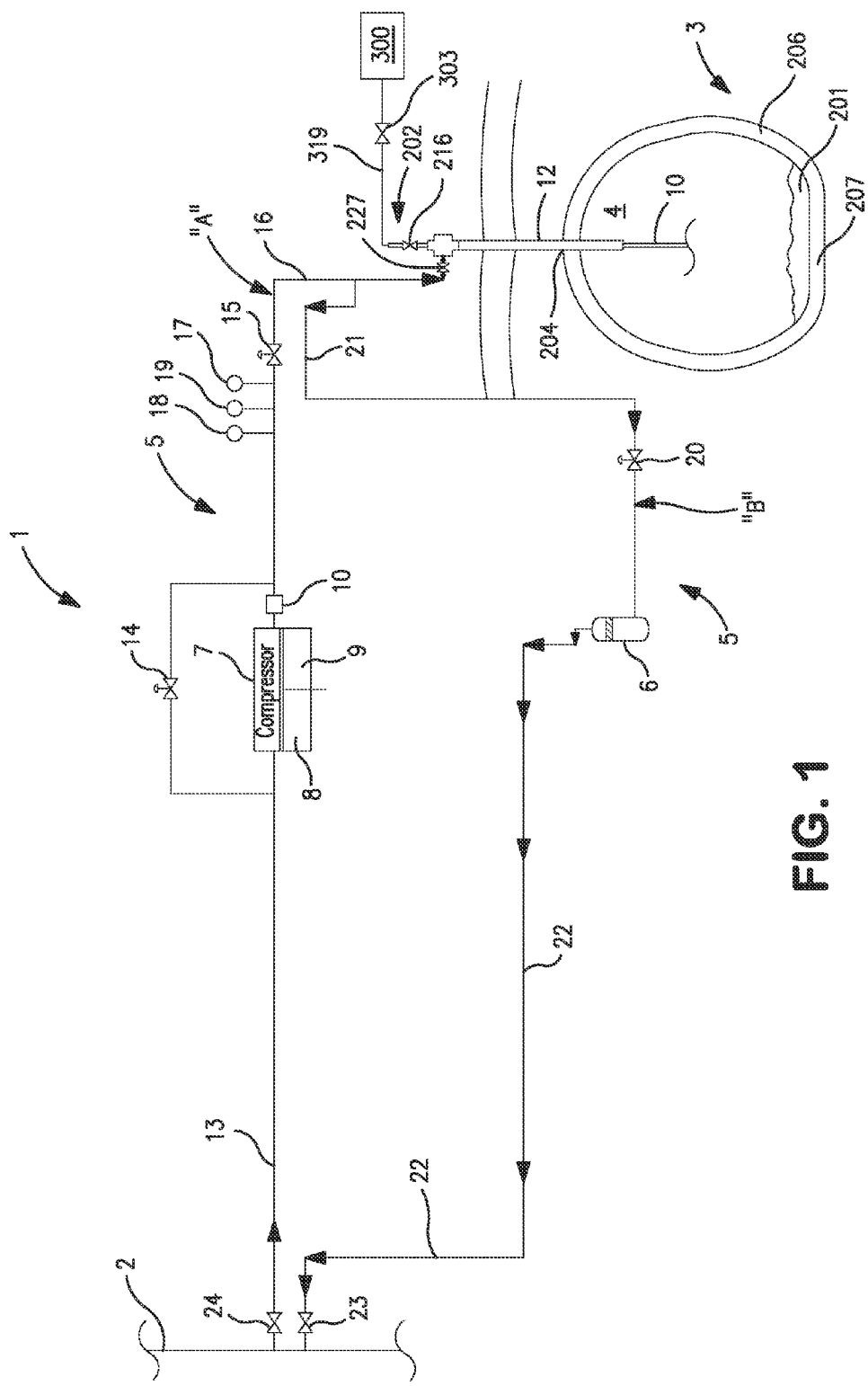
FIG. 1 shows a fragmentary schematic of a protocol for introducing and storing hydrogen to a hydrogen pipeline incorporating the principles of the invention.

As used herein, all concentrations are expressed as volumetric percentages. With reference to FIG. 1, a hydrogen storage and processing facility 1 is illustrated that is designed to remove hydrogen product from a hydrogen pipeline 2 during periods of low customer demand and store such hydrogen product within a salt cavern 3 as stored hydrogen 4. During periods at which demand for the hydrogen product exceeds the capabilities of the hydrogen pipeline 2 to supply hydrogen product to customers, stored hydrogen 4 can be removed from the salt cavern 3 and reintroduced into the hydrogen pipeline 2. In a manner that will be discussed, a permeation barrier within the salt cavern 3 can be formed and continuously maintained for storing hydrogen product. The ability to store hydrogen product within such a salt cavern 3 having a permeation barrier can advantageously produce a substantially leak-tight salt cavern not prone to seepage of stored hydrogen product through the salt cavern walls, as typically occurs with conventional salt caverns. The term "permeation barrier" as used herein is intended to refer to a salt cavern that when pressurized and/or thermally activated, restricts the passage of hydrogen flow through the walls of the salt. As a result, there is a reduction in the size and the quantity of interconnected pores or voids within the walls of the salt. Accordingly, this reduction in the size and quantity of interconnected pores or voids substantially minimizes or prevents the availability of flow paths for high purity hydrogen molecules of at least 95% purity and above, from escaping therein and thereafter through the surrounding rock salt of the salt cavern.

As known in the art, salt cavern 3 is formed by solution mining in which water is injected through a pipe known as a brine string 10. The water dissolves the salt, and the resulting brine during the mining operation is returned through the annular space (not shown) formed in the final well casing 12 or other conduit between the inner wall of the final well casing 12 and the outer wall of the brine string 10. After the solution mining operation is complete, the residual brine in the salt cavern 3 can be removed through the brine string 10 by pressure displacement resulting from injection of hydrogen through the final casing 12 or other conduit. Once the brine level reaches the bottom of the brine string 10, a top section of the brine string 10 is sealed off by valve 216 and a residual brine layer 201, also known as a brine sump, may remain in the salt cavern 3 at the bottom portion 207.

The rock salt walls of the salt cavern deposit into thick layers over time. The deposited layers are gradually covered and buried by overburden sediments. The weight or pressure of such overburden sediments causes the salt formations to form densified structures, which tend to undergo viscoplastic slippage or deformation to create densified mircrocracks. Such slippage causes the grains of the salt to possess an inherent porosity, which is generally somewhat pervious to hydrogen. While the salt generally has low permeability and porosity rendering it impermeable to hydrocarbons, the salt is significantly more prone to hydrogen permeation by virtue of hydrogen's small atomic radius.

When customer demand for the hydrogen, supplied by hydrogen pipeline 2 is low or for any reason, production exceeds demand, a hydrogen stream 13 can be removed from the hydrogen pipeline 2 and introduced into the salt cavern 3. In this regard, referring to FIG. 1, valve 24 is open to allow a portion of the product hydrogen in pipeline 2 to enter leg "A" of flow network 5. As used herein and in the claims, the term "legs" means flow paths within the flow network 5 that are formed by suitable conduits. Such conduits would be positioned to conduct the flow of the hydrogen streams within the flow network 5 as illustrated. Bypass valve 14 is set in a closed position, and valve 15 is set in an open position and valve 20 and valve 303 are set in a closed position to allow hydrogen stream 13 to be compressed in a hydrogen compressor 7 to produce a compressed hydrogen stream 16. Hydrogen compressor 7 can be any known compressor as used in the art, and is typically a compressor having a reciprocating piston. Hydrogen compressor 7 incorporates a first stage 8 and a second stage 9 in series with interstage cooling between stages and an aftercooler 10 which can be employed to remove the heat of compression. Alternatively, and as will be explained in greater detail below, the heat of compression can be transferred to the compressed hydrogen stream 16 when entering the salt cavern 3, as part of a thermal activation of the salt cavern 3. The compressor 7 is conventionally controlled to maintain the inlet pressure at a target suction pressure to maintain energy efficient operation of the compressor 7.

The compressed hydrogen stream 16 is introduced into the salt cavern 3 to form the stored hydrogen 4. The compressed hydrogen stream 16 continues to flow through the first leg "A". The compressed hydrogen stream 16 thereafter enters well-casing or conduit 12 (FIG. 2), which is connected to a transfer well head assembly 202, and thereafter into an annular flow area (not shown) within final well casing 12 (between the inside of final well casing 12 and brine string 10) from which the compressed hydrogen feed stream 16 enters salt cavern 3. Flow orifice meter 17, pressure transmitter 18 and temperature transmitter 19 can be used to determine the quantity of compressed hydrogen stream 16 that is introduced into the salt cavern 3.

Figure 2:
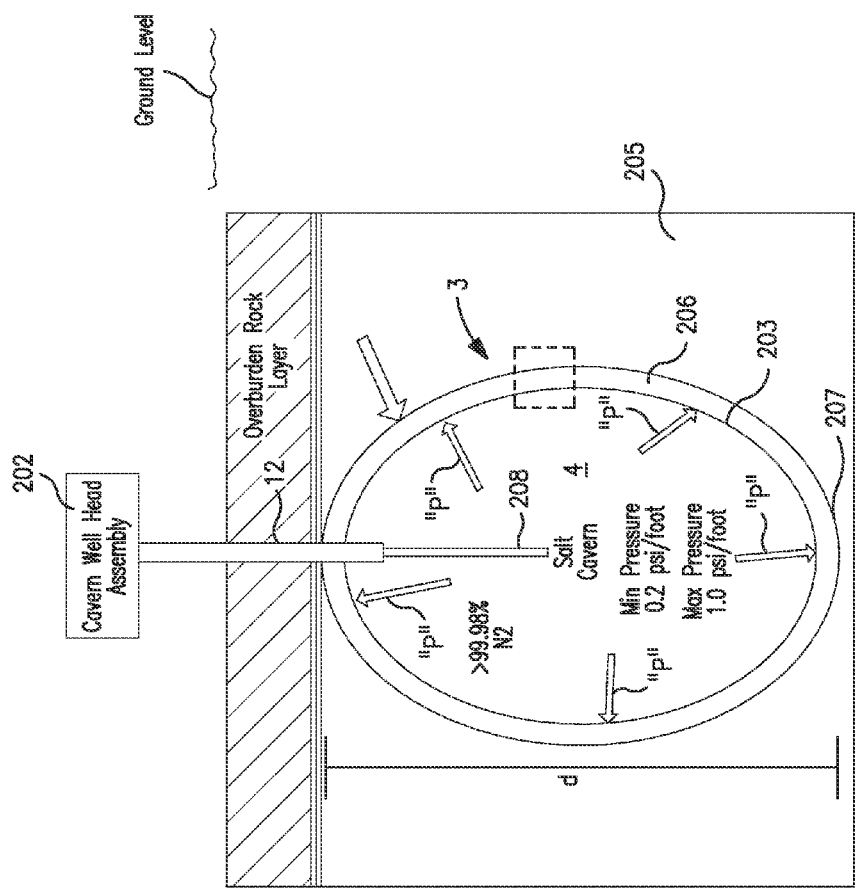
FIG. 2 shows a salt cavern having a permeation barrier.

FIG. 2 shows the cavern 3 of FIG. 1 in isolation. The pressure of the stored hydrogen 4 exerts a pressure, denoted as "P", against the walls 203 of the salt cavern 3. The cavern depth that starts at the top of the salt and ends at the bottom of the salt cavity is denoted as "d" and is defined as the vertical distance spanning from the top-most portion 204 to the bottom-most portion 207 of the salt cavern 3. The pressure exerted by the stored hydrogen 4 against the salt cavern walls 203 is maintained above a lower threshold limit and below an upper threshold limit such that there is a reduction in the size and the quantity of interconnected pores or voids within the walls 203 of the salt to form a permeation barrier 206. FIG. 2 shows that the permeation barrier 206 extends along the entire edge or boundary of the cavern 3. The permeation barrier 206 formed along the salt cavern walls has a reduced amount of interconnected porosity such that there are few or virtually no pathways for hydrogen to diffuse therethrough. The permeation barrier 206 as defined herein substantially prevents all of the molecules of the stored hydrogen 4 from passing therethrough and seeping into the rock salt 205, as shown in FIG. 2. It should be understood that the permeation barrier 206 in FIGS. 1 and 2 is shown as having a finite thickness only for purposes of illustrating the principles of the present invention.

The lower limit has been found by the inventors to be greater than about 0.2 psi per liner foot of cavern depth. In this example, at a cavern depth of about 2500 feet as shown in FIG. 2, the minimum pressure must be maintained at greater than about 500 psig to allow formation of the permeation barrier 206. In a preferred embodiment, the minimum pressure may be regulated so as to counteract the tendency of the salt cavern 3 to undergo creep closure, which occurs when the overburden cavern pressures is greater than the pressure within the cavern, causing the salt cavern 3 to close in and reduce the overall physical storage volume. Unlike the prior art, the present invention eliminates permeability of the salt cavern but still allows for counterbalancing of the creep closure.

Although maintaining the cavern 3 at a pressure exceeding the lower limit is advantageous, the inventors have also discovered an upper limit for pressure which cannot be exceeded. The upper limit has been found to be less than about 1 psi per liner foot of cavern depth. In this example, at a cavern depth of about 2500 feet as shown in FIG. 2, the maximum pressure must be maintained at a pressure lower than 2500 psig to allow for proper maintenance of the permeation barrier 206. Exceeding the upper limit can cause the salt walls 203 to fracture, thereby causing the stored hydrogen 4 to flow upward through the fractures into the rock salt 205 and eventually to the surface, which could cause a potential safety hazard if the proper conditions existed such that the released hydrogen ignited.

Exploded views of a portion of the permeation barrier 206 in FIG. 2 that is circumscribed by the rectangular dotted region is illustrated in FIGS. 4A-4C under three different cavern pressure scenarios. FIG. 4A shows that when the stored hydrogen 4 is maintained in the cavern 3 at a pressure substantially less than 0.2 psi per foot of cavern depth, hydrogen seepage occurs across the salt walls 203. FIG. 4A indicates that the porosity or voids along at least certain portions of the salt walls 203 are marginally large enough to allow availability of hydrogen molecules to flow therethrough. Such a scenario is representative of the stored hydrogen 4 being stored below the lower limit.

FIG. 4C, on the other hand, is indicative of one or more cracks or fractures along the salt walls 203 which can potentially form when the stored hydrogen 4 is maintained in the cavern 3 at a pressure substantially greater than about 1 psi per foot of cavern depth. The cracks are sufficiently large to allow hydrogen to leak therethrough. By way of comparison, the hydrogen leakage across the salt walls 203 occurs at a higher flow rate than the hydrogen seepage in FIG. 4A by virtue of the cracks creating larger flow paths. The scenario of FIG. 4C is representative of the stored hydrogen 4 being stored above the upper limit.

FIG. 4B shows successful formation of the permeation barrier 206 in which molecules of the stored hydrogen 4 remain entirely confined within the interior volume of the salt cavern 3. FIG. 4B shows that the stored hydrogen 4 is maintained in the cavern 3 at a pressure greater than 0.2 psi per foot of cavern depth but less than 1 psi per foot of cavern depth. The permeation barrier 206 creates a reduction in the size and quantity of interconnected pores or voids within the salt walls 203, thereby reducing or preventing the availability of flow paths for high purity hydrogen molecules from escaping the interior volume of the salt cavern 3.

In a preferred embodiment, the stored hydrogen 4 can be maintained in a pressure range that can vary between 0.4 to 0.8 psig per liner foot of cavern depth to form and maintain a permeation barrier 206 that can confine the stored hydrogen 4 within the walls 203 of the salt cavern 3. The permeation barrier 206 is formed by reducing the porosity of the cavern walls sufficiently enough to prevent the passage of high purity hydrogen molecules. In a preferred embodiment, the salt cavern 3 can be stored with 99.99% pure hydrogen gas without detectable seepage through the barrier 206.

Effectiveness of the permeation barrier 206 can be assessed with pressure and temperature measurements. For instance, a pressure measurement is made in the cavern 3 by a downhole pressure transducer 208 to ensure the proper pressure range is maintained. Alternatively, a local cavern wellhead surface pressure measurement device (not shown), which may be located within the cavern wellhead assembly 202, can be employed for measuring pressure. The pressure transducer 208 extends through the well-casing or conduit 12 of the cavern well head assembly 202. Alternatively or in addition to pressure gauges, one or more temperature gauges are placed at various locations within the interior volume of the salt cavern 3 to monitor the integrity of the permeation barrier 206. For example, a downhole temperature gauge can extend through the conduit 12 and be positioned at a predetermined location within the stored hydrogen 4. Because hydrogen displays a negative Joule-Thompson coefficient, any seepage of the stored hydrogen 4 through walls 203 will manifest itself as a localized temperature excursion. Estimated temperature excursions as a result of seepage of hydrogen leakage have been observed to be on the order of 4° F. for pressure loss of about 1200 psig in a cavern 3.

If it is determined that leakage is occurring through the cavern 3, the pressure of the stored hydrogen 4 can be adjusted as needed to form a permeation barrier 206 that is less prone to leakage of the stored hydrogen 4 therethrough. For example, if the downhole pressure transducer 208 shows that the pressure in the cavern 3 has exceeded the upper limit, a portion of the stored hydrogen 4 can be withdrawn from cavern 3 until the pressure falls to below the upper limit. Valve 20 would be opened to allow a portion of the stored hydrogen 4 to be discharged from cavern 3 as a crude hydrogen stream 21. Because the pressure of the stored hydrogen 4 is higher than that of the pipeline 2 in this example, the crude hydrogen stream 21 readily flows through the second leg "B" of flow network 5. When the appropriate amount of stored hydrogen 4 has been removed, valve 20 is closed to isolate the cavern 3. Cavern pressure and temperature can be monitored as described above to ensure that the permeation barrier 206 is adequate.

In yet another example, if the downhole pressure transducer 208 indicates that the pressure in the cavern 3 has fallen below the lower limit, a portion of the hydrogen product from the pipeline 2 can be introduced into the cavern 3 until the pressure of the cavern 3 increases to at least slightly above the lower limit. Valve 24 is set in the open position and bypass valve 14 is set in the closed position, as the pressure in the pipeline 2 is sufficient for the hydrogen product to free flow along leg "A" without requiring pressurization by compressor 7. Valve 15 is also open and valve 20 is closed. The additional hydrogen increases the pressure exerted against the walls 203 of cavern 3 such that the porosity of the walls 203 of salt cavern 3 is partially compressed, which in turn reduces the voids and grain boundaries of the salt to a size substantially small enough to prevent all of the stored hydrogen 4 from passing therethrough. Cavern pressure and temperature can be monitored as described above to ensure that the permeation barrier 206 is adequate. When the appropriate amount of hydrogen product from the pipeline 2 has been introduced into cavern 3, valve 15 is closed to isolate the cavern 3. As a result, a critical mass of stored hydrogen 4 is always kept in cavern 3 to maintain the permeation barrier 206.

Figure 3:
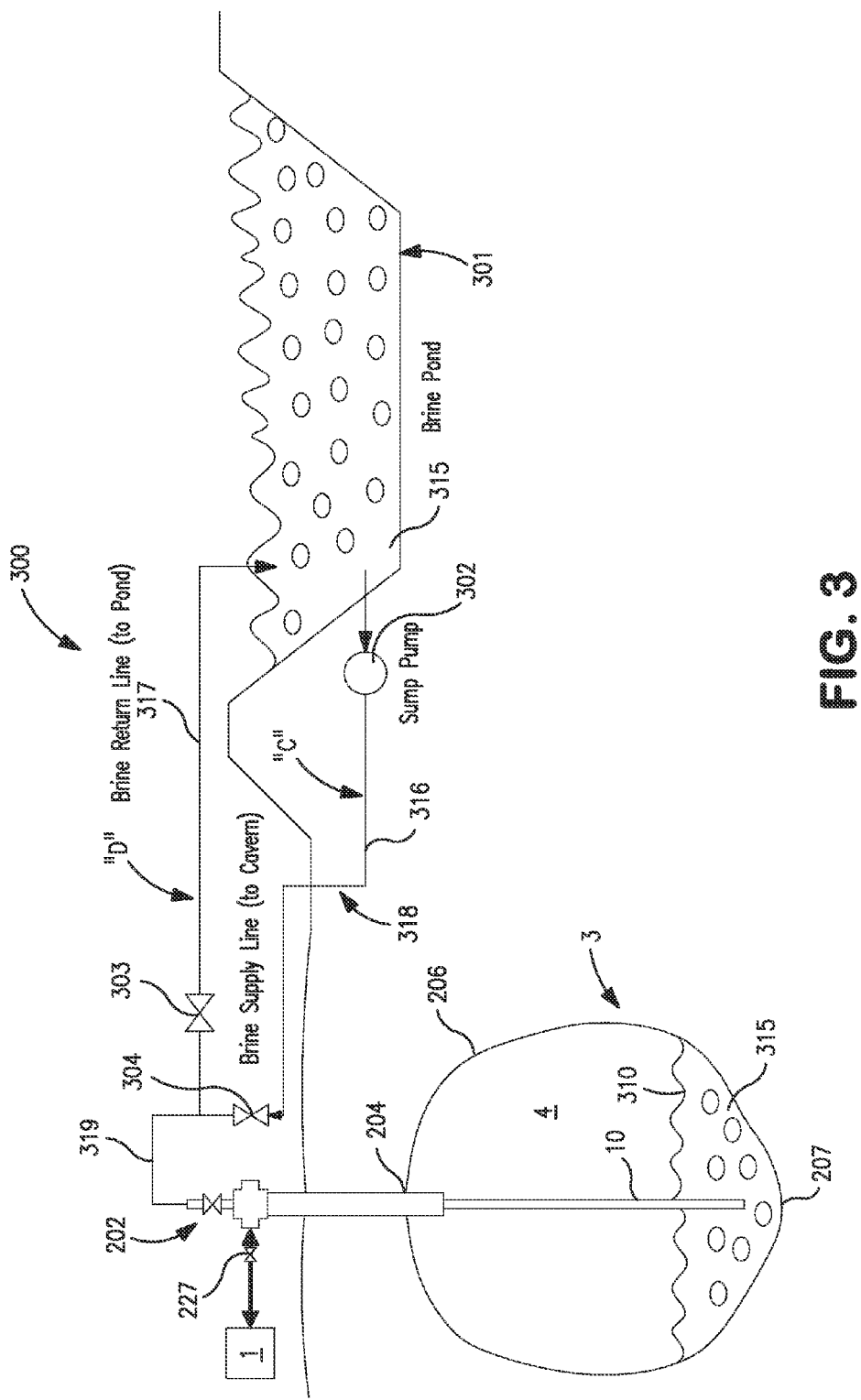
FIG. 3 shows a brine pond reservoir for providing brine into the salt cavern of FIG. 2 as needed to increase the cavern pressure to a predetermined pressure threshold for maintaining the permeation barrier.

In an alternative embodiment, there will be instances when a hydrogen generation facility is taken off-line or when demand for hydrogen by customers otherwise exceeds the available production capabilities, either of which necessitates removal of substantially all of the stored hydrogen 4 from the salt cavern 3. In such a case, the cavern 3 can approach a hydrogen depleted state. A cavern in a "hydrogen depleted" state as defined herein refers to a cavern containing minimal hydrogen such that the cavern pressure is significantly below the lower limit. In one example, the hydrogen depleted state may be 50-90% below the lower limit. In order to maintain the permeation barrier 206, fluid can be temporarily introduced into the salt cavern 3 to maintain the pressure in the cavern 3 necessary for the permeation barrier 206. The term "fluid" as used herein is intended to cover either a gas phase, liquid phase or a combination thereof. FIG. 3 describes one possible embodiment of a brine pond system 300 for achieving continued maintenance of the permeation barrier 206. Brine 315 from a brine pond reservoir 301 can be introduced into the salt cavern 3 so as to occupy the depleted cavern 3. The brine pond system 300 includes a reservoir 301 and sump pump 302 for transporting brine 302 into the salt cavern 3 as needed to increase the cavern pressure beyond the lower limit for maintaining the permeation barrier 206. The brine pond 300 also includes a flow network 318 consisting of a discharge leg "C", a return leg "D", valve 303 and valve 304. The flow network 318 allows the brine 315 to be transported to the salt cavern 3 through leg "C" and returned thereafter back into the brine pond 301 through leg "D".

In operation, brine 315 exits from the bottom of the brine pond reservoir 301 utilizing sump pump 302, which pressurizes and transports the brine 315 along flow leg "C" as brine stream 316. Valve 303 is closed, and valve 304 is set in the open position to allow the brine stream 316 to flow through a conduit 319 connected to the transfer well head valve 202 and thereafter into an annular flow area (not shown) within final well casing 12 (between the inside of final well casing 12 and brine string 10) from which the brine stream 316 enters salt cavern 3.

The brine 315 occupies the bottom portion 207 of the cavern 3. As a result, the usable volume of the cavern 3 is reduced. The reduction in volume of the salt cavern 3 allows for the remaining stored hydrogen 4 contained in the interior volume of the cavern 3 to occupy a smaller storage volume, thereby increasing the pressure of the cavern 3. Brine 315 continues to enter salt cavern 3 through brine string 10 until downhole pressure transducer 208 detects that the cavern pressure has reached above the lower limit. Alternatively, wellhead pressure measuring devices (not shown), which may be located within the cavern wellhead assembly 202, can be utilized to detect cavern pressure. When the desired caver pressure is detected, valve 304 can be closed to isolate the cavern 3. In the manner described herein, the permeation barrier 206 can be maintained, even though the cavern 3 has been depleted of hydrogen.

Other variations are possible and are within the scope of the present invention. For instance, the brine 315 may be introduced into the cavern 3 so as to displace the stored hydrogen 4 therein. As pressurized brine 315 enters brine string 315, the stored hydrogen 4 can be displaced upwards through the annular space of the well casing 12 as a crude hydrogen stream. In other words, the driving force for displacing the stored hydrogen 4 is provided by the pressurized brine 315 entering downwards into the cavern 3 through the brine string 10. Well head valve 227 is set in an open position to enable the crude hydrogen withdrawn from the cavern 3 to enter the hydrogen storage and processing facility 1, shown in FIG. 1. The crude hydrogen is discharged as a crude hydrogen stream 21. The crude hydrogen stream 21 readily flows through the second leg "B" of flow network 5 and is exported into the product pipeline 2 with valve 23 set in the open position. In still another variation, not all of the stored hydrogen 4 need be removed. Brine 315 can be injected into the cavern 3 as described above so as to establish a specific cavern pressure that is between the lower pressure threshold and the upper pressure threshold to maintain the permeation barrier. The addition of brine 315 occupies the bottom portion 207 of cavern 3 (FIG. 3) and reduces the effective volume of the stored hydrogen 4 contained therein. The reduction in volume compresses the stored hydrogen 4, thereby increasing the cavern pressure to the desired pressure level that is within the lower and upper limits. In this manner, permeation barrier 206 can be effectively formed and maintained.

When a sufficient amount of product hydrogen from the product pipeline 2 is to be stored in hydrogen cavern 3, as may occur, for example, as a result of hydrogen production exceeding customer demand, the brine 315 within the salt cavern 3 can be returned to the brine pond 301. In a preferred embodiment, product hydrogen is drawn off from the pipeline 2, compressed and injected into the cavern 3. Compression by compressor 7 ensures that the product hydrogen stream has sufficient driving force to displace the brine 315 from out of the cavern 3 into return leg "D" of flow network 318 (FIG. 3). Valve 24 (FIG. 1) is open to allow a portion of the product hydrogen in pipeline 2 to enter leg "A" of flow network 5 as hydrogen product stream 13. Valve 20 is closed, and bypass valve 14 is set in a closed position to allow the hydrogen product stream 13 to be compressed by compressor 7 to form a compressed hydrogen product stream 16. Valve 15 is open to allow the compressed hydrogen product stream to flow through well casing 12 and thereafter enter cavern 3.

The compressed hydrogen stream 16 is introduced into the salt cavern 3 to form the stored hydrogen 4. The compressed hydrogen stream 16 continues to flow through the first leg "A". The compressed hydrogen stream 16 thereafter enters conduit 12 (FIG. 2), which is connected to a transfer well head assembly 202, and thereafter into an annular flow area (not shown) within final well casing 12 (between the inside of final well casing 12 and brine string 10) from which the compressed hydrogen feed stream 16 enters salt cavern 3. As the compressed hydrogen product enters salt cavern 3, the brine 315 stored therein is displaced upwards through the well casing 12. Valve 303 is opened, and valve 304 is closed to allow the brine 315 to flow as stream 317 through the return leg "D" of flow network 318 of the brine pond system 300 into the brine pond 301. A pump may be employed to pressurize brine stream 317, if necessary. In this manner, the return of the brine 315 to the brine pond 301 is possible.

As an alternative to the above described brine pond system 300, it should be understood that the present invention also contemplates permanently retaining a minimal amount of brine 315 along the bottom portion 207 of the cavern 3 so that brine 315 does not need to be transported to and from a brine pond 301. The preferred amount of brine 315 to be permanently retained at the bottom portion 207 of the cavern 3 would be that amount which is equivalent to reduce the effective hydrogen storage volume of the cavern 3 such that the compression of the cavern volume is always pressurized slightly above the lower limit pressure threshold. In such an embodiment of the present invention, only the upper limit for the cavern pressure threshold would need to be regulated to ensure formation of the permeation barrier 206 without fracture of the salt walls 203. Cavern pressure and temperature can be monitored with suitable instrumentation as has been described to ensure that the permeation barrier 206 is being maintained.

Other techniques for forming and maintaining the permeation barrier 206 of the salt cavern 3 are contemplated. For example, a controlled amount of heat can be imparted to the salt walls 203 to cause the walls 203 to attain a state of plasticity in which a portion of the walls 203 begin to move, thus closing and sealing any pores, voids and/or microfractures within the salt walls 203. The amount of heat that gets transferred from the compressed hydrogen stream 16 to the walls 203 can vary, depending upon the crystal and grain structure of the salt walls 203, the composition of the salt itself and other operating factors, such as the quantity of residual brine remaining in the cavern 3 and the throttling of the aftercooler 10. Preferably, the amount of heat needed to sufficiently produce a rise in the temperature in the cavern 3 at a particular depth of cavern 3 should be greater than the natural geothermal temperature gradient of the earth that corresponds to the particular depth of cavern 3. The amount of temperature rise needed to create this sealing mechanism and drive the salt to a more plastic physical state may be about 0.1° F./linear foot of depth of the cavern 3, denoted as "d" in FIG. 2. In other words, a temperature rise of about 250° F. occurs for the cavern 3 being referenced in this embodiment. The portions of the walls 203 can become fluid-like when heated by the hydrogen stream 16 to fill in at least a portion of the porous walls 203, thereby creating a more densified wall 203 that is less permeable to the flow of stored hydrogen 4 therethrough. The temperature of compressed hydrogen stream 16 can be modulated by controlling the rate of cooling from the aftercoolers 10 situated downstream of the compressor 7. In one example, the temperature of the compressed hydrogen stream 16 can be controlled to be greater than 200° F. by momentarily shutting off the aftercoolers 10 for a predetermined time. As the hotter hydrogen stream 16 is introduced into the cavern 3, it contacts the cooler walls 203, thereby heating the cooler walls 203. A portion of the walls 203 is heated and can become sufficiently plastic-like to enable filling in of some of the porous material, thereby altering the microstructure of the salt walls 203. In particular, the temperature of the salt walls 203 increases as heat diffuses therein. The heating causes grains to combine with each other. As a result, the grain sizes are increased, and the number of grain boundaries decrease. The reduction in grain boundaries creates fewer diffusion pathways for the stored hydrogen 4. A less porous structure is thereby created in which the number of pores and size of the pores of the walls 203 can both be decreased. This transfer of heat from the compressed hot hydrogen stream 16 to the salt walls 203 can potentially reduce the impact of stress dilation and micro fracturing of the salt 203, thereby strengthening and improving the properties of the salt permeation barrier 206. Such a temperature treatment to the cavern 3 can be conducted one or more times as needed to suitably alter the grain microstructure of the salt walls 203.

EXAMPLE

Figure 5B:
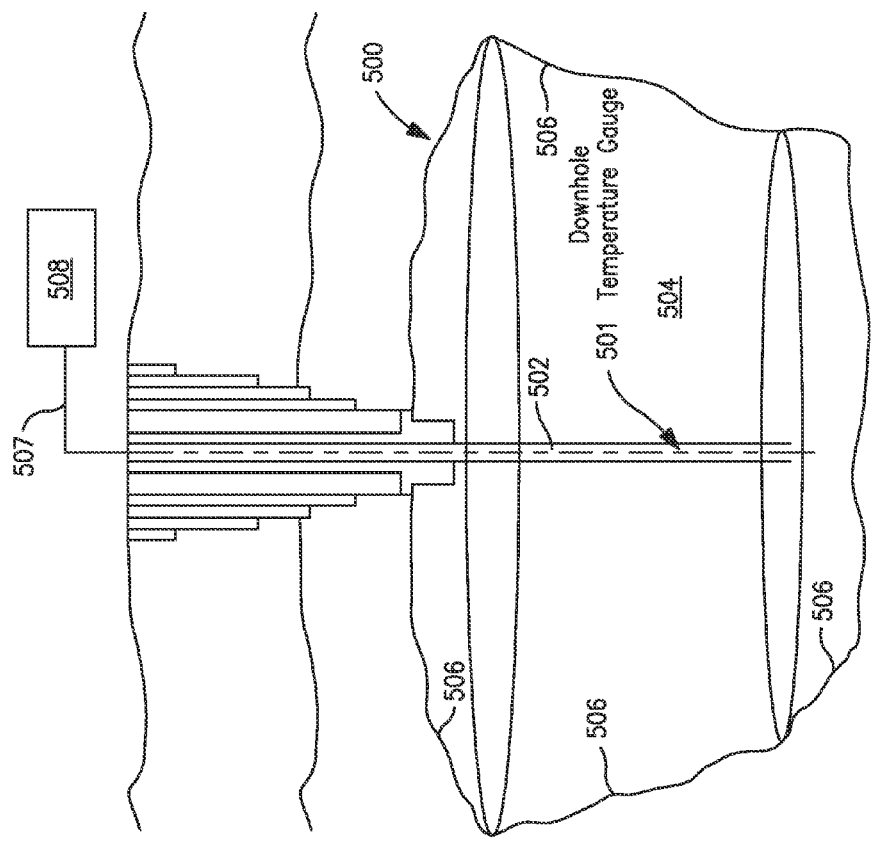
FIG. 5b shows a leakage detection system that can be employed during the mechanical integrity verification of the salt cavern.

A mechanical integrity test was conducted to evaluate and verify the structural integrity of a salt cavern for storing hydrogen in accordance with the principles of the present invention. FIG. 5b shows the test-setup. A gaseous hydrogen stream was withdrawn from hydrogen pipeline, compressed and then injected into the cavern 3 as a compressed stored hydrogen 504, in a similar manner as described in FIG. 1. A pressure transducer (e.g., as shown in FIG. 2) was used to monitor and regulate the pressure of the stored hydrogen 504 to ensure that the pressure was maintained above the minimum limit but below the upper limit. As a result, a permeation barrier 506 was formed and maintained throughout the mechanical integrity test. FIG. 5 shows that the permeation barrier 506 extended continuously along the walls of the cavern 500.

Figure 5A:
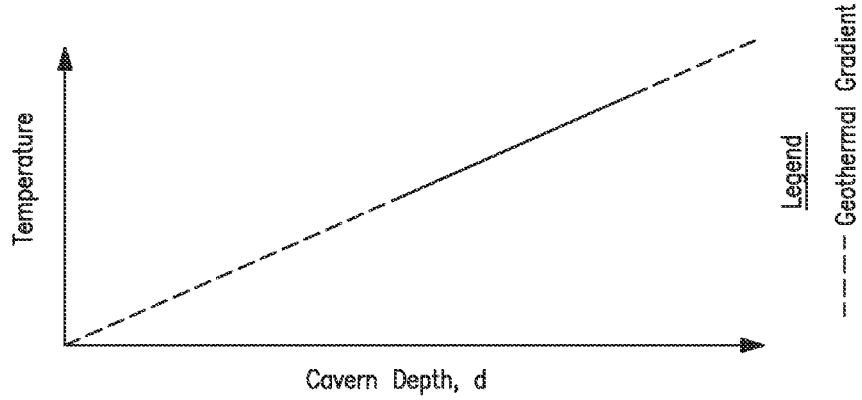
FIG. 5a shows a geothermal temperature profile generated during a mechanical integrity test.

Downhole retractable temperature gauges and instrumentation were inserted into the cavern 3 at various depths to generate a temperature profile gradient as a function of cavern depth, "d" (shown in FIG. 5a). The temperature gauges were also utilized to detect leakage of hydrogen on the basis of any temperature excursions in the cavern 500. The temperature excursions occur because hydrogen has a negative Joule-Thompson coefficient upon volume expansion. FIG. 5 shows one of the temperature gauges 501 that were inserted through well casing 502 within the interior volume of salt cavern 500. The temperature gauge 501 and the other gauges (not shown, for purposes of clarity) were calibrated to accurately and precisely detect temperature excursions on the order of 0.01° F. or more. Placement of the temperature gauges at different depths within the cavern 3 allowed for the capability to detect localized leaks, including those from the well casing 502. The output signal 507 from the temperature gauge 501 and others (not shown) were coupled to an active control system 508 configured to close the cavern's emergency shutdown valves located within cavern wellhead assembly 202 (FIG. 2), if necessary, as a result of leakage detection. Accompanying high temperature alarms were programmed into the control system 508. Similarly, alarms for low and high pressure limits were programmed into control system 508. The temperature gauges utilized in the test provided accuracy within plus/minus 0.1° F., and the pressure gauge utilized in the test provided accuracy to within plus/minus 0.05%.

The pressure and temperature readings were compiled for 72 continuous hours. The downhole pressure and temperature readings obtained at a depth of 50% of the cavern depth, d, were employed to calculate the volume of stored hydrogen 504 within the salt cavern 500 at the start of the test and at the conclusion of the test. Any measurement error, as indicated by the inherent accuracy and precision of the temperature pressure gauges and instrumentation, were factored into the gas volume computation. The results indicated that the volume of stored hydrogen 504 at the start of the test was equal to the total volume of stored hydrogen 504 at the end of the test. Further, the temperature profile gradient shown in FIG. 5 was linear and did not exhibit any discernible temperature excursions. The results supported the conclusion that the permeation barrier 506 was formed and maintained during the 72 hours test window.

The ability of the present invention to store ultrahigh purity hydrogen without volume losses of the stored product is an improvement over conventional storage methods. Furthermore, the permeation barrier reduces seepage and leakage of the hydrocarbon contaminants from the salt walls 203 into the stored hydrogen volume, potentially reducing the costs associated with implementing suitable purification equipment for the subsequent withdrawal of the stored hydrogen 4. For example, the required sizing of adsorption beds in the present invention would be potentially smaller than of conventional storage caverns, as less contaminants would be required to be removed upon withdrawal of the stored hydrogen 4 from salt cavern 3 to achieve a product purity specification. In conventional storage caverns, the inherent porosity of the salt walls 203 may contribute to introduction of a larger amount of contaminants from the salt walls 203 into the interior of the cavern 3, thereby requiring larger purification units (e.g., adsorption units). Accordingly, the present invention offers a unique process benefit with respect to the amount of purification required when the stored hydrogen gas 4 is withdrawn from the cavern 3. Such a process benefit translates into a more cost effective hydrogen storage processing facility relative to conventional salt cavern hydrogen storage facilities.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method for storing hydrogen product in a salt cavern, comprising:
   removing hydrogen product from a hydrogen pipeline;
   compressing the hydrogen product to produce a compressed hydrogen product;
   introducing the compressed product of hydrogen into the salt cavern to produce stored hydrogen within the salt cavern;
   maintaining the stored hydrogen at a pressure between a lower limit and an upper limit within the cavern, whereby the salt cavern forms a substantially impermeable barrier to the stored hydrogen therein between the lower limit and the upper limit, wherein the compressed hydrogen product introduced into the salt cavern comprise a purity of at least 95% or greater.

2. The method of claim 1, wherein the lower limit is at a pressure greater than about 0.2 psi per linear foot of depth within the cavern.

3. The method of claim 1, wherein the upper limit is at a pressure less than about 1 psi per linear foot of depth within the cavern.

4. The method of claim 1, wherein the pressure of the stored hydrogen is maintained at a pressure at least about 0.4 psi per linear foot of depth within the cavern.

5. The method of claim 1, wherein the pressure of the stored hydrogen is maintained at a pressure no greater than about 0.85 psi per linear foot of depth within the cavern.

6. The method of claim 1, wherein substantially none of the hydrogen permeates into the salt cavern when the stored hydrogen is at a pressure at least about the lower limit or greater.

7. The method of claim 1, wherein substantially none of the hydrogen leaks and/or seeps through the salt cavern.

8. The method of claim 1, further comprising
   monitoring the pressure of the stored hydrogen; and
   adjusting the pressure of the stored hydrogen to be maintained between the lower limit and the upper limit.

9. The method of claim 8, further comprising
   monitoring the pressure of the stored hydrogen to fall below the lower limit; and
   introducing additional hydrogen product and/or brine into the salt cavern to produce additional stored hydrogen and/or brine to increase the pressure of the stored hydrogen to at least the lower limit.

10. The method of claim 8, further comprising
    monitoring the pressure of the stored hydrogen to determine if the pressure exceeds the upper limit; and
    withdrawing a portion of the hydrogen product from the salt cavern to the hydrogen pipeline to lower the pressure of the stored hydrogen to at least the upper limit.

11. The method of claim 1, further comprising withdrawing the stored hydrogen in an amount substantially equal to the amount of hydrogen product introduced into the salt cavern.

12. A method for forming and maintaining a permeation barrier of a salt cavern, comprising:
    compressing a fluid to produce a compressed fluid;
    introducing the compressed fluid into a salt cavern to produce stored fluid within the salt cavern;
    forming a permeation barrier at least along a portion of walls of the salt cavern, wherein the porosity of the walls of the salt cavern is partially reduced to a size substantially small so as to prevent substantially all of the stored hydrogen from passing therethrough; and
    regulating the pressure of the salt cavern above a lower limit and below an upper limit to maintain the permeation barrier wherein the fluid is hydrogen having a purity of at least 95% or greater.

13. The method of claim 12, further comprising:
    monitoring the temperature in the cavern; and
    regulating the temperature in the cavern above a predetermined temperature by reducing an operating rate of an aftercooler situated downstream of the compressor.

14. The method of claim 13, wherein the temperature in the cavern is greater than about 100° F.

15. The method of claim 12, further comprising:
    withdrawing substantially all of the stored fluid from the cavern to deplete the cavern; and
    introducing a sufficient amount of brine into the cavern to create a cavern pressure that is above the lower limit and below the upper limit thereby maintaining the permeation barrier.

16. The method of claim 13, further comprising:
    preventing trapped hydrocarbons or other contaminants in the salt walls from being introduced and contaminating the stored hydrogen product.

17. A system for forming and maintaining a permeation barrier within a salt cavern, comprising:
    a compressor configured to pressurize hydrogen product within the salt cavern to form stored hydrogen wherein the compressed hydrogen product introduced into the salt cavern comprise a purity of at least 95% or greater;
    a flow network positioned between the compressor and the salt cavern, the flow network comprising a first leg, a second leg and a third leg;
    the first leg in flow communication with the salt cavern to introduce product hydrogen into the salt cavern to form stored hydrogen that is stored at a pressure above a lower limit and below an upper limit to form a permeation barrier;

the second leg in flow communication with a hydrogen pipeline and the first leg to discharge the stored hydrogen formed from the salt cavern; and the third leg in flow communication with the salt cavern to introduce a fluid into the cavern to maintain the permeation barrier.

18. The system of claim 17, further comprising a temperature detection means for monitoring a temperature of the cavern.

19. The system of claim 17, wherein the third leg is in flow communication with a brine pond reservoir configured for providing a sufficient amount of brine into the cavern when the cavern approaches a depleted state so as to increase the cavern pressure to at least the lower limit but below the upper limit, thereby maintaining the permeation barrier of the salt cavern.

20. The system of claim 17, further comprising a pressure detection means for monitoring the pressure of the cavern.

21. The system of claim 17, wherein the salt cavern is maintained with the permeation barrier when all of the stored hydrogen is removed.

22. The system of claim 17, further comprising a leak detection system for monitoring the integrity of the salt cavern.

* * * * *